(12) United States Patent
Lan

(10) Patent No.: US 11,811,205 B2
(45) Date of Patent: Nov. 7, 2023

(54) SWITCH AND SOCKET COVER STRUCTURE, AND SOCKET STRUCTURE AND SWITCH STRUCTURE THEREOF

(71) Applicant: Min-Chang Lan, Taoyuan (TW)

(72) Inventor: Min-Chang Lan, Taoyuan (TW)

( * ) Notice: Subject to any disclaimer, the term of this patent is extended or adjusted under 35 U.S.C. 154(b) by 0 days.

(21) Appl. No.: 17/567,901

(22) Filed: Jan. 4, 2022

(65) Prior Publication Data

US 2023/0216284 A1 Jul. 6, 2023

(51) Int. Cl.
*H02G 3/08* (2006.01)
*F21V 23/04* (2006.01)
*F21Y 115/10* (2016.01)

(52) U.S. Cl.
CPC ......... *H02G 3/081* (2013.01); *F21V 23/0464* (2013.01); *F21Y 2115/10* (2016.08)

(58) Field of Classification Search
CPC . H02G 3/081; F21V 23/0464; F21V 23/0442; F21V 23/04; F21Y 2115/10
See application file for complete search history.

(56) References Cited

U.S. PATENT DOCUMENTS

| 6,350,039 | B1* | 2/2002 | Lee ........................ H01H 9/181 362/147 |
| 7,714,790 | B1* | 5/2010 | Feldstein ................. H01Q 1/22 343/702 |
| 8,393,747 | B2* | 3/2013 | Kevelos ................. H01H 13/83 362/558 |
| 11,239,647 | B2* | 2/2022 | Davis ....................... H01H 9/08 |
| 2007/0291469 | A1* | 12/2007 | Chen ...................... H01H 9/181 362/95 |
| 2014/0265883 | A1* | 9/2014 | Mortun .................. H05B 47/11 315/158 |

* cited by examiner

*Primary Examiner* — Peggy A Neils
(74) *Attorney, Agent, or Firm* — Fei-hung Yang

(57) ABSTRACT

A switch and socket cover structure includes a light transmitting cover, an LED light panel, a carrying board and a light control switch component. The light transmitting cover has a first opening, a light emitting area on a side of the first opening, and a light sensing area on a side of the first opening. The LED light panel is installed to the bottom of the light transmitting cover and corresponsive to the light emitting area, the carrying board is installed to the bottom of the light transmitting cover and has a second opening corresponding to the first opening, and an accommodating slot corresponding to the light sensing area. The light control switch component is installed in the accommodating slot and provided for the light sensing area to detect ambient light, and the light control switch component is electrically connected to the LED light panel.

19 Claims, 14 Drawing Sheets

1

1

1

SWITCH AND SOCKET COVER STRUCTURE, AND SOCKET STRUCTURE AND SWITCH STRUCTURE THEREOF

BACKGROUND

Technical Field

The present disclosure relates to the technical field of power switches and sockets, and more particularly to a switch and socket cover structure and its socket structure and switch structure that provides a clear position indication in a dark environment to improve the convenience of daily life.

Description of Related Art

In a building, predetermined power supply positions are reserved on the walls of the building according to the wiring direction and configuration to facilitate the use or control of the power supply in indoor space. When the switch or socket structures are installed to the reserved positons on the walls, a cover is usually installed on the wall to cover the hole and protect the switches or sockets, and only the switch buttons and socket holes are exposed from the wall. In the present application, people often encounter the situation of uneasy to confirm the positions of the switches or sockets in a dark environment or the positions of some sockets are blocked by furniture or other objects, and thus it is difficult to know the position and condition of the socket. These situations cause extreme inconvenience to daily life, particularly for the accommodation in an unfamiliar environment.

SUMMARY

Therefore, it is a primary objective of the present disclosure to provide a switch and socket cover structure and its socket structure and switch structure capable of automatically detecting ambient light, emitting light in a dark environment, and clearly guide users to the switch or socket position.

To achieve the foregoing and other objectives, the present disclosure discloses a switch and socket cover structure, comprising: a light transmitting cover, having a first opening, at least one light emitting area and at least one light sensing area, and the light emitting area being disposed on a side of the first opening, and the light sensing area being disposed on a side of the first opening; at least one LED light panel, installed to the bottom of the light transmitting cover and configured to be corresponsive to the light emitting area; a carrying board, installed to the bottom of the light transmitting cover, and having a second opening and at least one accommodating slot, and the second opening being configured to be corresponsive to the first opening, and the accommodating slot being configured to be corresponsive to the light sensing area; and at least one light control switch component, installed in the accommodating slot and provided for the light sensing area to detect an ambient light, and the light control switch component being electrically coupled to the LED light panel; wherein the light control switch component will drive the LED light panel to emit light to make the light emitting area emit light, if an insufficient ambient light is detected. Therefore, when there is insufficient ambient light, the LED light will be used to guide the users to the switch or socket position, so as to improve the convenience of the application significantly.

Based on the aforementioned switch cover component of the present disclosure, this disclosure further discloses a socket structure, comprising: a junction box; the aforementioned switch and socket cover structure for covering an opening of the junction box; and a socket component, configured to be corresponsive to the first opening and the second opening, and the socket component has a side exposed to the outside and the other side disposed inside the junction box. Therefore, the switch and socket cover structure can be used to emit light to achieve the guiding effect when there is an insufficient ambient light.

This disclosure further discloses a switch structure, comprising: a junction box; the aforementioned switch and socket cover structure for covering an opening of the junction box; and a switch component, configured to be corresponsive to the first opening and the second opening, and the switch component has a side exposed to the outside and the other side disposed inside the junction box. Similarly, the switch and socket cover structure can be used to emit light to achieve the guiding effect when there is an insufficient ambient light and improve the convenience of use.

DESCRIPTION OF THE EMBODIMENTS

Figure 1A:
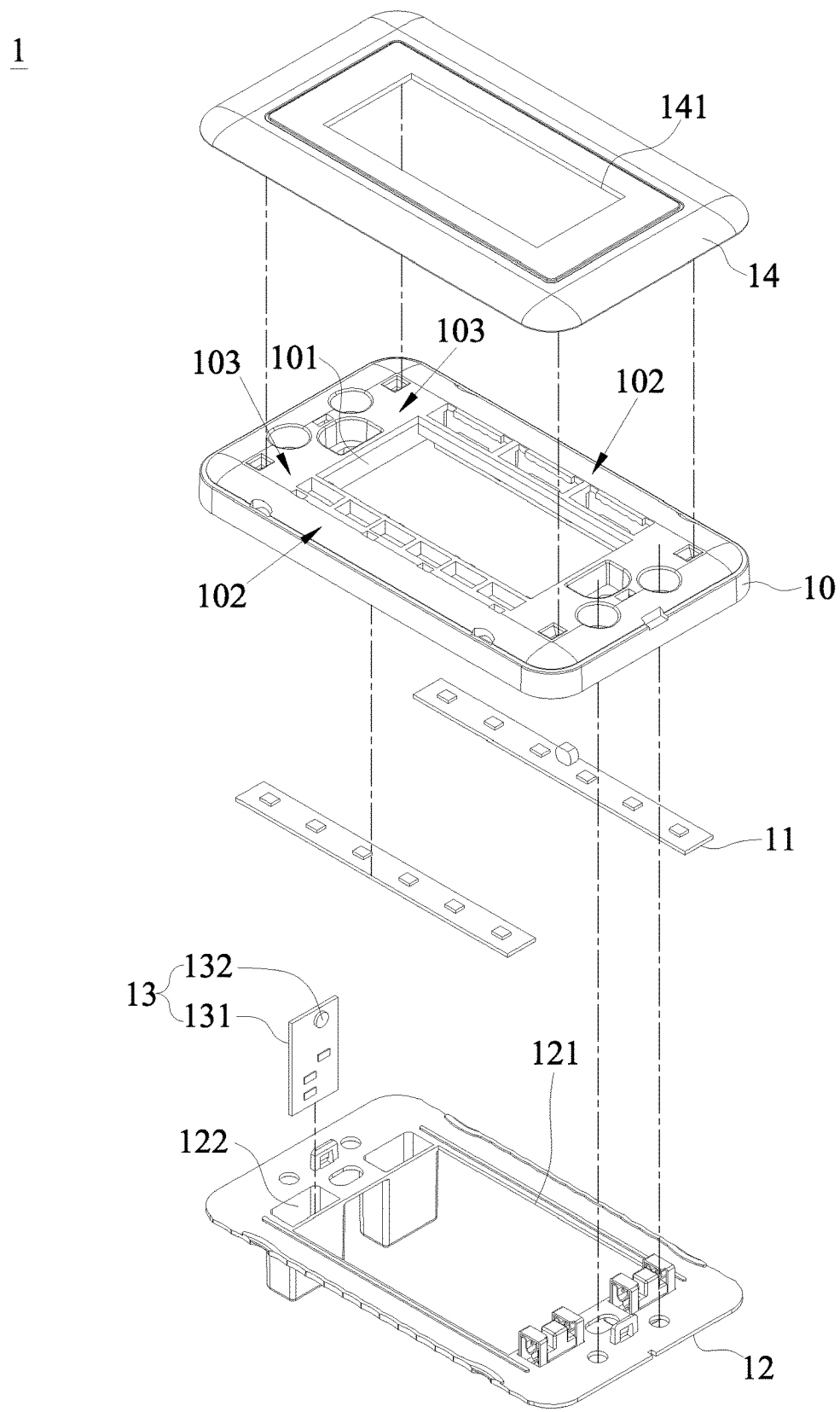
FIG. 1A is an exploded view of a switch and socket cover structure in accordance with a preferred embodiment of this disclosure.

This disclosure will now be described in more detail hereinafter with reference to the accompanying drawings that show various embodiments of the invention.

With reference to FIGS. 1A, 1B, 2, 3, and 4A to 4F for the two exploded views, the two perspective views, and the front, rear, left, right, top and bottom views of a switch and socket cover structure in accordance with a preferred embodiment of the present disclosure respectively, the switch and socket cover structure 1 is used for covering a power socket and a power switch, shielding the electrically connected objects inside a wall, and protecting the power socket and power switch. The switch and socket cover structure 1 comprises a light transmitting cover 10, at least one LED light panel 11, a carrying board 12 and at least one light control switch component 13.

Figure 7:
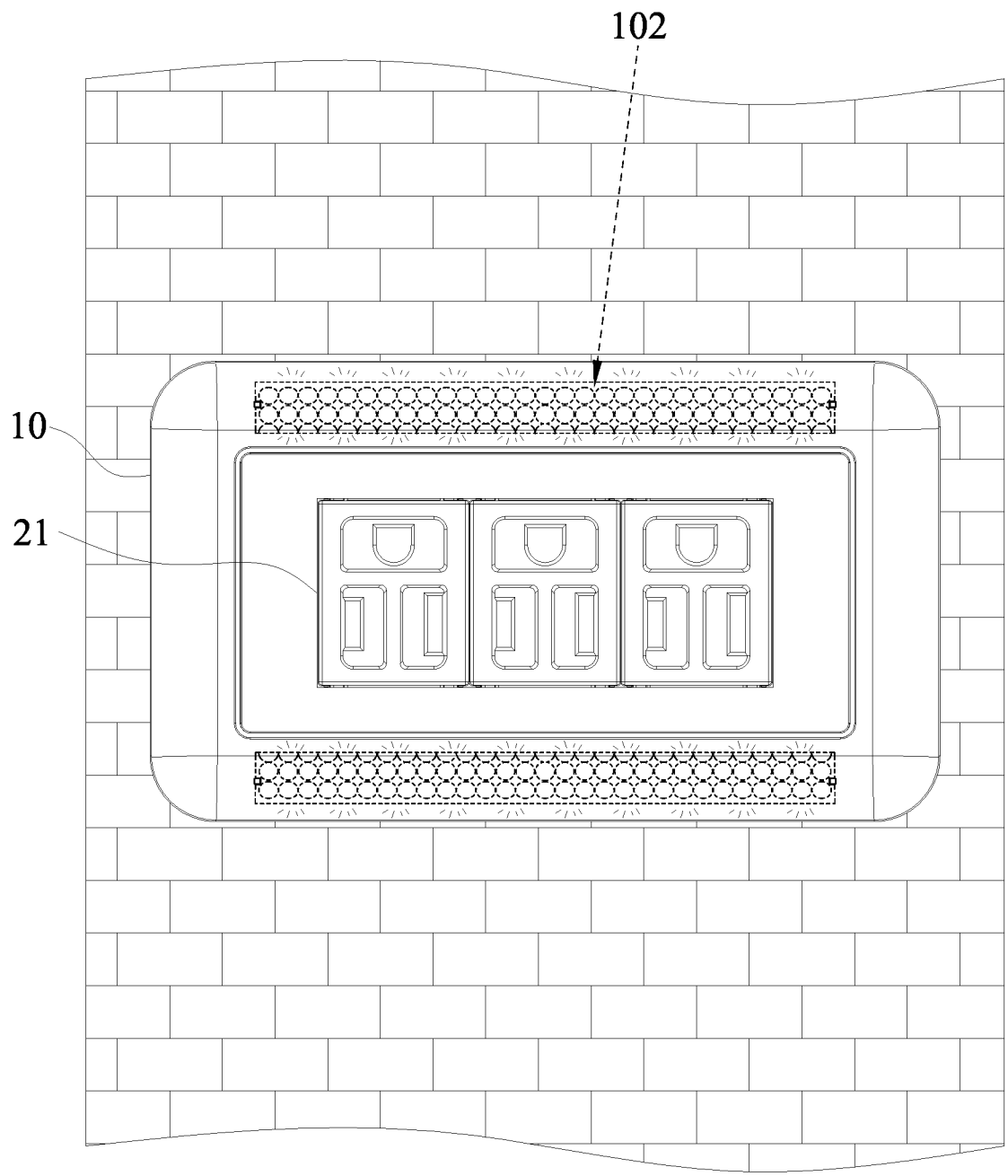
FIG. 7 is a schematic view showing an application of a socket structure in accordance with a preferred embodiment of the present disclosure.
Figure 8:
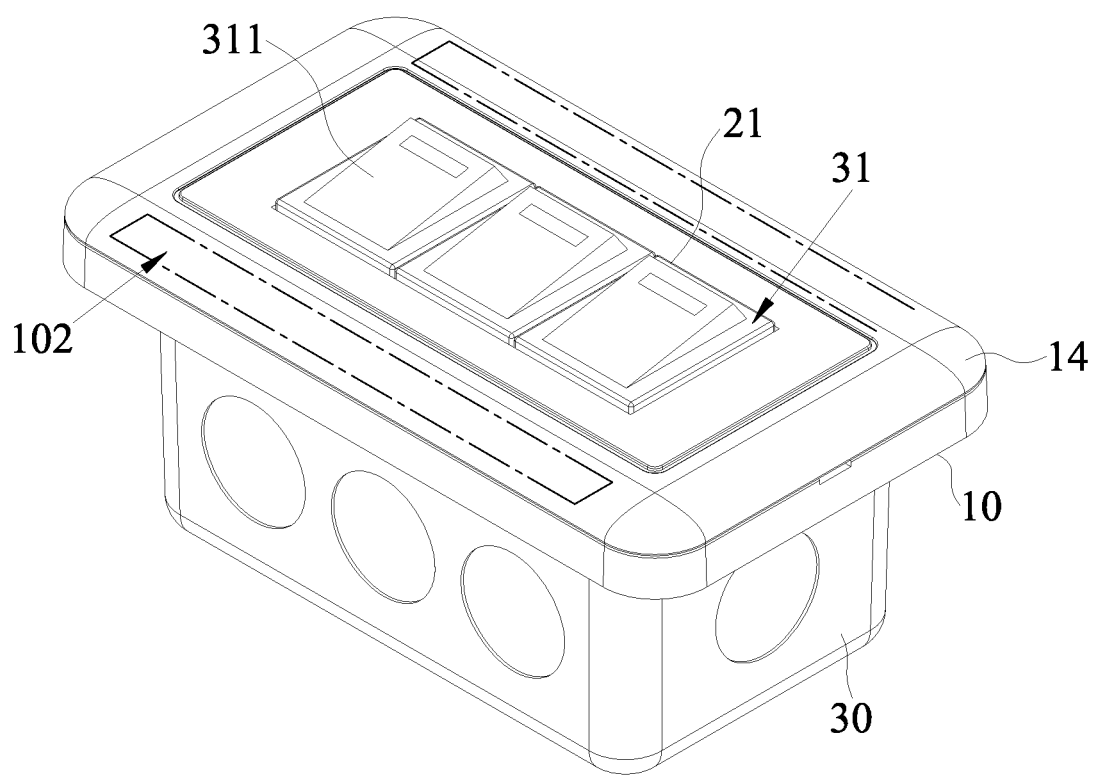
FIG. 8 is a perspective view of a switch structure in accordance with a preferred embodiment of the present disclosure.

The light transmitting cover 10 has a first opening 101, at least one light emitting area 102 and at least one light sensing area 103. In a preferred embodiment, the first opening 101 is disposed at the center position of the light transmitting cover 10 for exposing the power socket or power switch, the light emitting area 102 is disposed on a side of the first opening 101a side, and the light sensing area 103 is disposed on a side of the first opening 101. The LED light panel 11 is installed to the bottom of the light transmitting cover 10 and configured to be corresponsive to the light emitting area 102 for providing light. Wherein, the power supply of the LED light panel 11 comes from the utility power electrically coupled to the switch and socket cover structure 1 at the LED light panel 11 or the electrical power of a battery. The carrying board 12 is installed to the bottom of the light transmitting cover 10 and has a second opening 121 and at least one accommodating slot 122, and the second opening 121 and the first opening 101 are configured to be corresponsive to each other, and the accommodating slot 122 is configured to be corresponsive to the light sensing area 103. The light control switch component 13 is installed in the accommodating slot 122 and provided for the light sensing area 103 to detect an ambient light, and the light control switch component 13 is electrically coupled to the LED light panel 11, for example, by an electric wire (not shown in the figure) for an electrical connection. When detecting an insufficient ambient light, the light control switch component 13 will drive the LED light panel 11 emit light, so that the light emitting area 102 will also emit light (as shown in FIG. 7). Therefore, when the switch and socket cover structure 1 is detected to be situated in a dark environment, the light control switch component 13 will automatically drive the LED light panel 11 to product bright light, so as to achieve the effect of guiding a user to the socket or switch position, and the light control switch component 13 can automatically control the light emission to achieve the energy saving effect. Wherein, the detection of ambient light by the light control switch component 13 refers to the detection of the intensity of the received ambient light. For example, if the light control switch component 13 receives an amount of ambient light less than a predetermined value, then it will be determined that no ambient light has been detected.

Figure 1B:
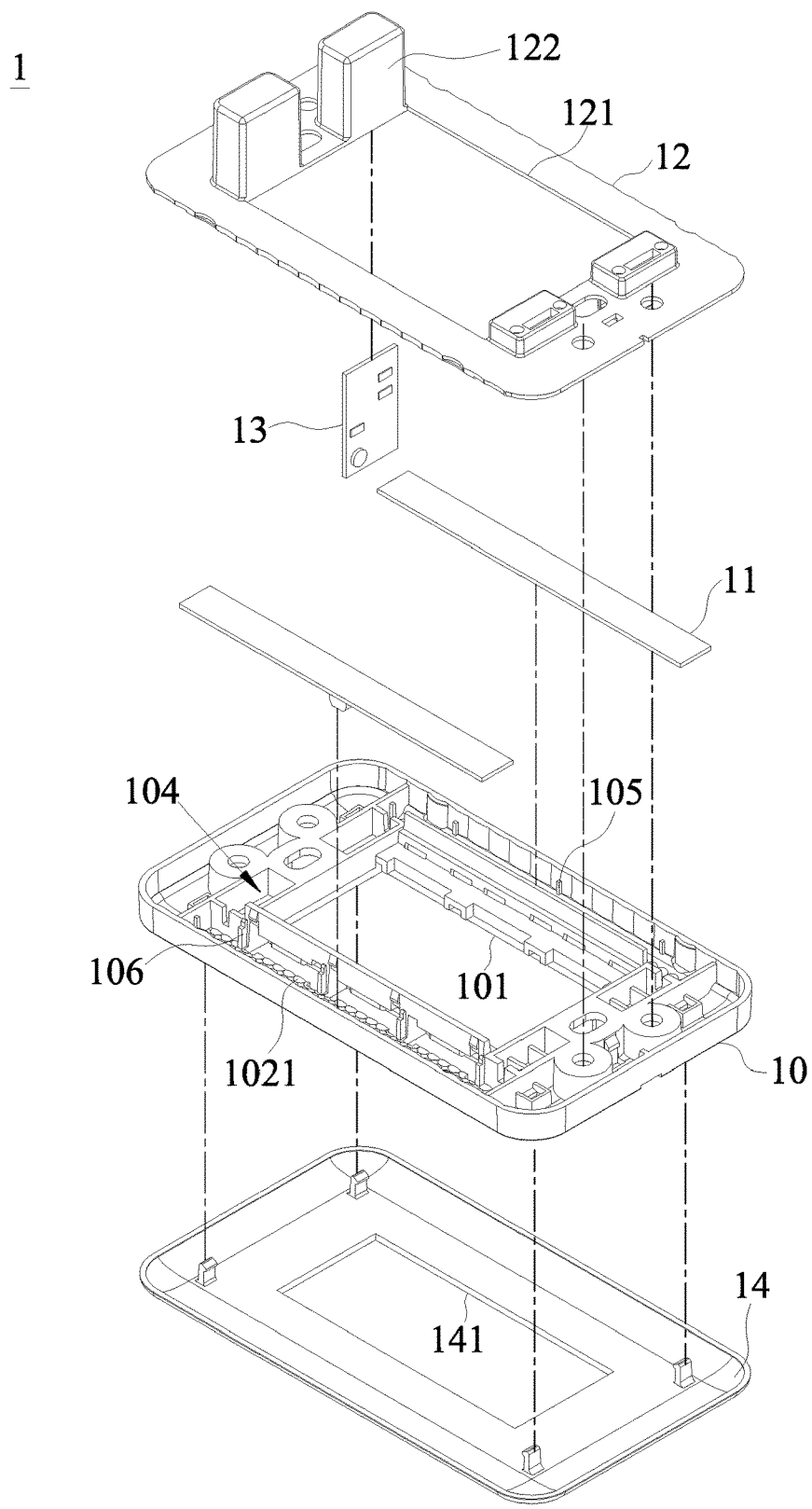
FIG. 1B is another exploded view of a switch and socket cover structure in accordance with a preferred embodiment of this disclosure.
Figure 2:
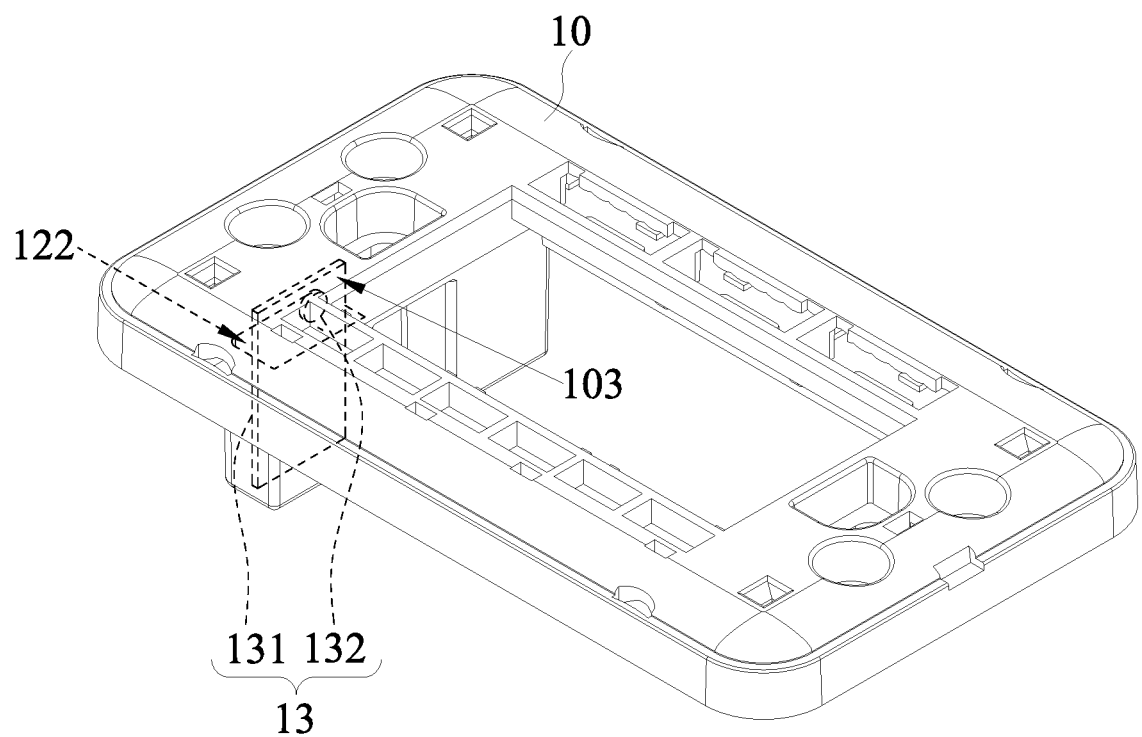
FIG. 2 is a perspective view of a switch and socket cover structure in accordance with a preferred embodiment of this disclosure.
Figure 3:
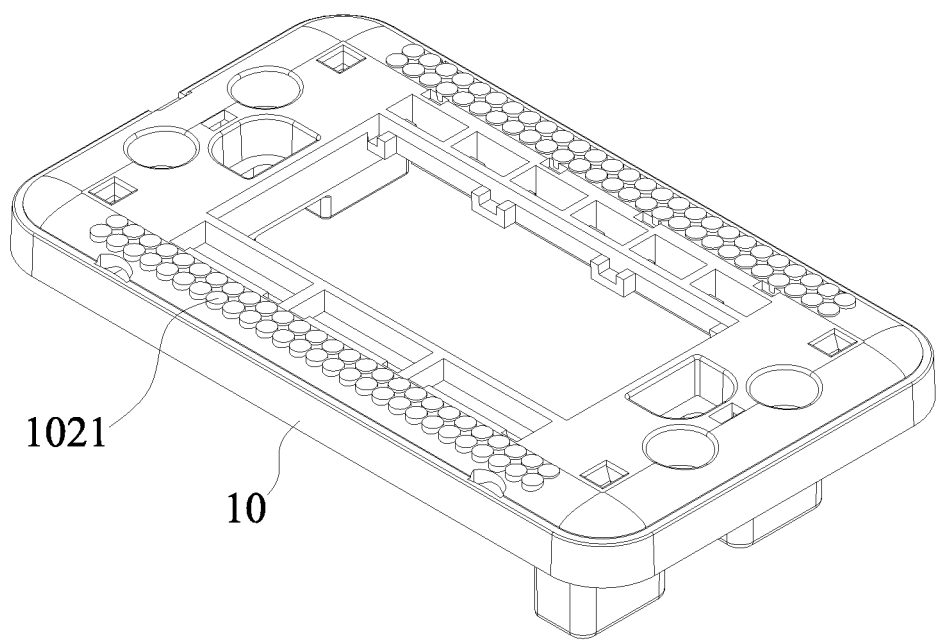
FIG. 3 is another perspective view of a switch and socket cover structure in accordance with a preferred embodiment of this disclosure.
Figure 4A:
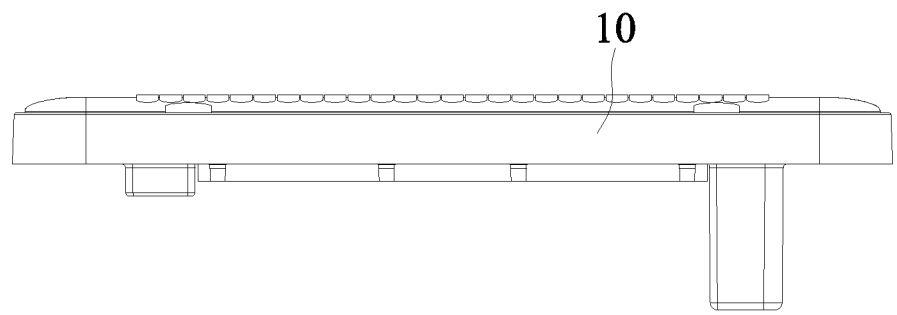
FIG. 4A is a front view of a switch and socket cover structure in accordance with another preferred embodiment of this disclosure.
Figure 4B:
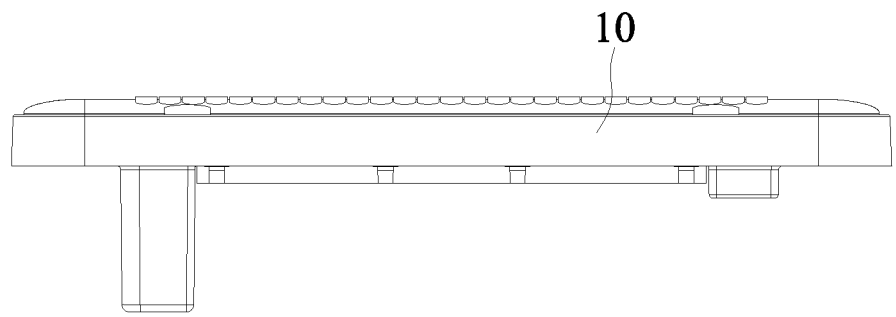
FIG. 4B is a front view of a switch and socket cover structure in accordance with the other preferred embodiment of this disclosure.
Figure 4C:
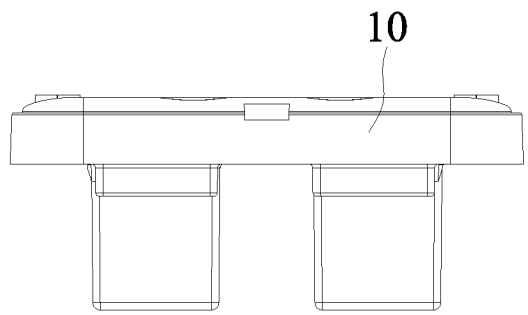
FIG. 4C is a left side view of a switch and socket cover structure in accordance with the other preferred embodiment of this disclosure.
Figure 4D:
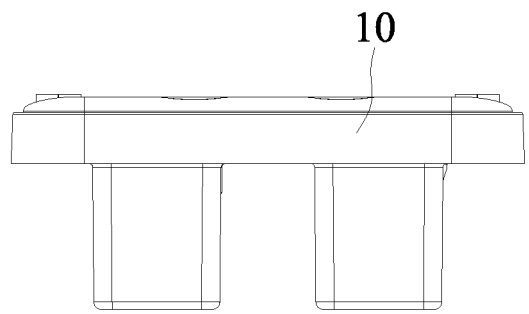
FIG. 4D is a right side view of a switch and socket cover structure in accordance with the other preferred embodiment of this disclosure.
Figure 4E:
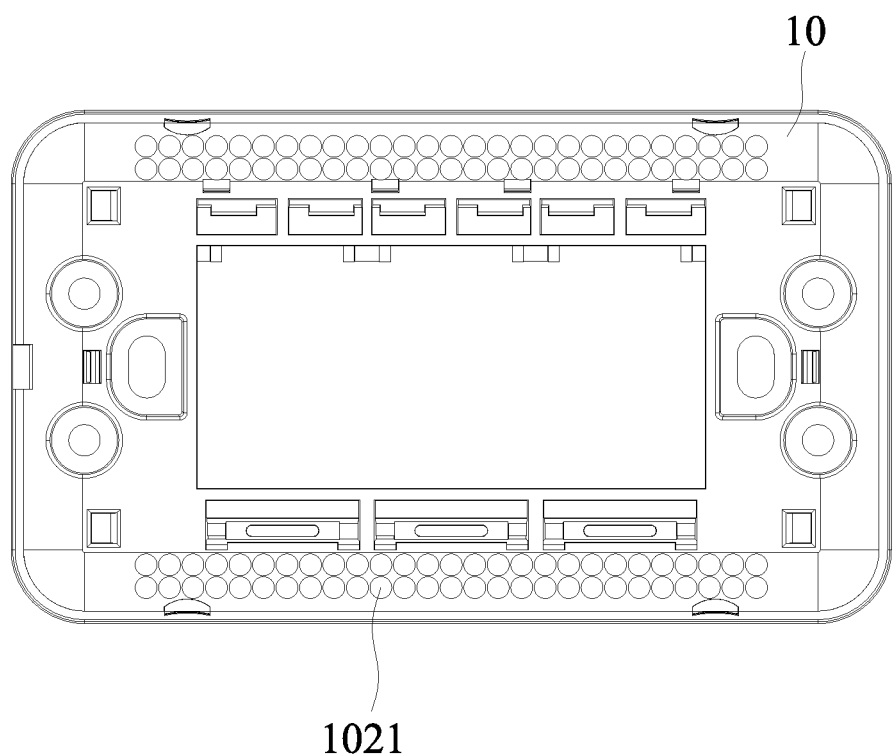
FIG. 4E is a top view of a switch and socket cover structure in accordance with the other preferred embodiment of this disclosure.
Figure 4F:
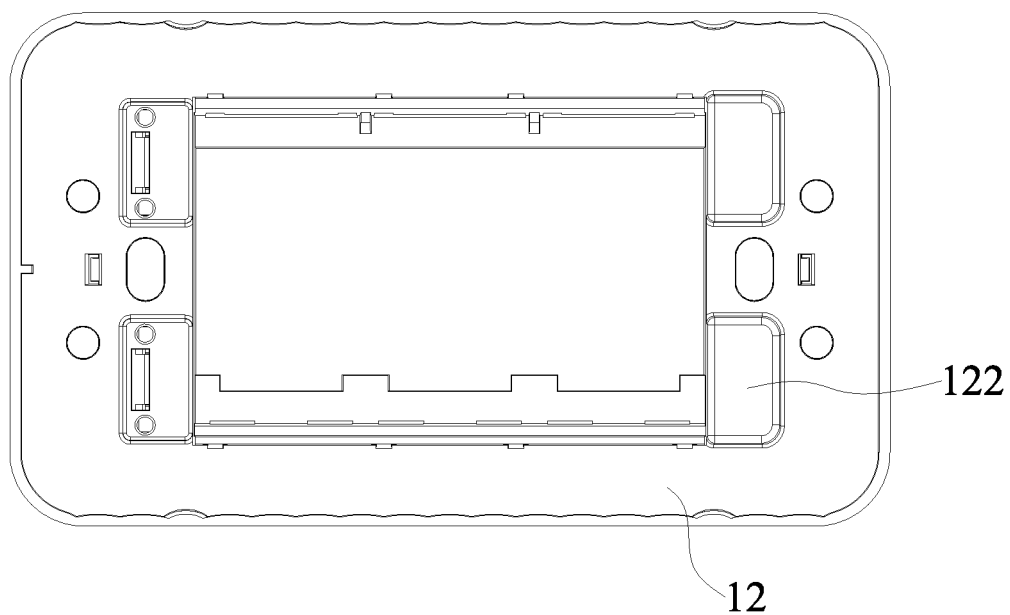
FIG. 4F is a bottom view of a switch and socket cover structure in accordance with the other preferred embodiment of this disclosure.
Figure 5:
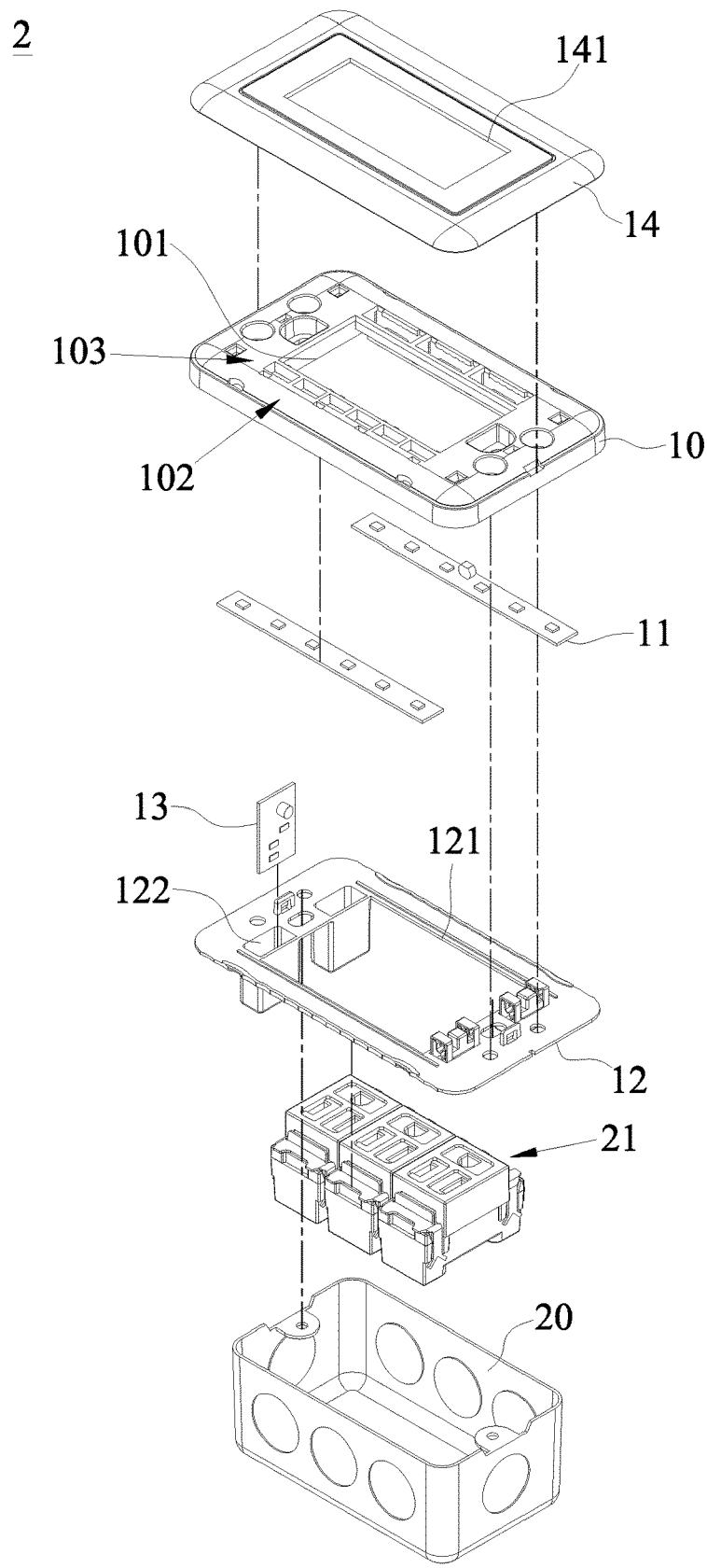
FIG. 5 is an exploded view of a socket structure in accordance with a preferred embodiment of the present disclosure.
Figure 6:
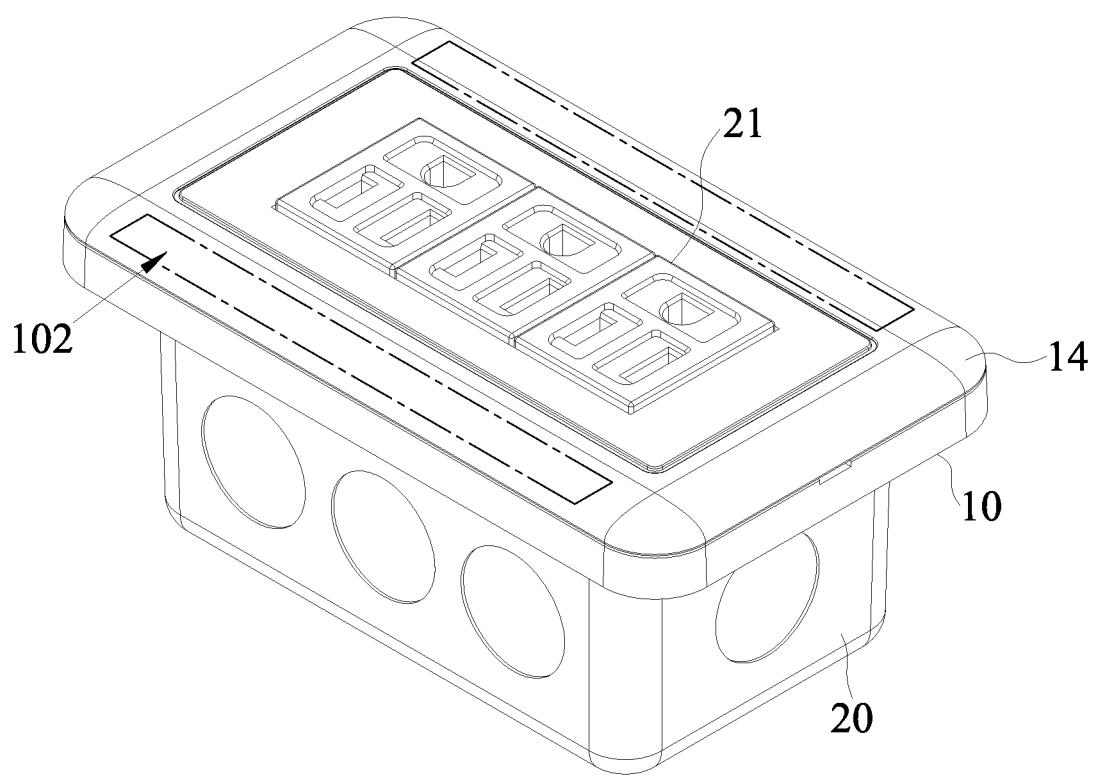
FIG. 6 is a perspective view of a socket structure in accordance with a preferred embodiment of the present disclosure.

In order to make the light outputted from the light emitting area 102 more uniformly, softer, and having sufficient brightness, the light emitting area 102 preferably has a plurality of optical structures 1021 for adjusting the condition of the light projected from the LED light panel 11, so that the LED light can be adjusted by the optical structures 1021 to provide a better lighting performance. In the meantime, the light adjusting effect of the optical structures 1021 can reduce the quantity of installed LEDs to lower the cost of the product effectively, wherein the optical structures 1021 can be installed on the inner surface of the light transmitting cover 10 (as shown in FIG. 1B), or on the outer surface of the light transmitting cover 10 (as shown in FIGS. 3 to 4F). The optical structures 1021 can be bead-like bumps or hexagonal cone-shaped bumps, and the optical structures 1021 of this embodiment are bead-like bumps arranged closely adjacent to one another. If the optical structures 1021 are hexagonal cone-shaped bumps, the optical structures 1021 can also be arranged closely with each other in a diamond pattern. In addition, the lighting of the LED light panel can be set to a continuous light mode or a blinking mode.

In an embodiment, the light control switch component 13 has a circuit board 131 configured to be perpendicular to a surface of the light transmitting cover 10, and the light control switch component 13 also has a photoresistor 132 installed at an end of the circuit board 131 near the light sensing area 103, so that the size of the light sensing area 103 can be decreased effectively to allow the light transmitting cover 10 to have better allocation and utilization of the structure. With the configuration of the circuit board 131 of the light control switch component 13 and the light transmitting cover 10 perpendicular to each other, and the photoresistor 132 installed adjacent to the light sensing area 103, the light transmitting cover 10 can be appropriately divided into a plurality of light sensing areas 103. In addition, when the switch and socket cover structure 1 is covered onto a socket or a switch, the socket structure and the switch structure will be basically fixed to the position of the first opening 101 only, so that the space perpendicular to the periphery of the first opening 101 can be utilized, and the discloser of the present disclosure conceives an idea of using the space effectively and arranges the circuit board 131 of the light control switch component 13 in a perpendicular manner. As a result, the photoresistor 132 can successfully receive the ambient light with a smaller light sensing area 103 to achieve the control function and utilize the space effectively, and the light transmitting cover 10 can have sufficient space for connection or other functions by its limited size and area. Wherein, the power supply of the light control switch component 13 comes from the circuit board 131 directly connected to the utility power, or the light control switch component 13 has a battery (not shown in the figure) provided for supplying the required electrical power.

In order to improve the stability of the installed light control switch component 13, at least one fixing slot 104 is formed at the bottom of the light transmitting cover 10, wherein the bottom of the fixing slot 104 is the light sensing area 103, and the fixing slot 104 is provided for latching the circuit board 131 of the light control switch component 13. Through the fixing slot 104, when the light control switch component 13 is installed in the accommodating slot 122 and the top side of the circuit board 131 is protruded from the accommodating slot 122, the top side of the circuit board 131 can be latched to remain unmoved in response to the fixing slot 104, not just allowing the photoresistor 132 to face the light sensing area 103 to detect light, but also preventing the light control switch component 13 from being hit by an external force to cause a shift of the light control switch component 13 and affect the detection and control effect. If the size of the circuit board 131 of the light control switch component 13 is larger than the fixing slot 104, a hole can also be formed on an edge of the fixing slot 104 to allow the circuit board 131 to pass through the hole to defined a clamped state and maintain the stability of the installed circuit board 131.

In addition, bottom of the light transmitting cover 10 has at least one first snap rib 105 and at least one second snap rib 106, and the first snap rib 105 is formed by extending an edge of the light transmitting cover 10, and the first snap rib 105 and the second snap rib 106 are used to fix the LED light panel 11, so that the installation of the LED light panel 11 can be more stable to ensure that each LED of the LED light panel 11 can project the light to the light emitting area 102 at a predetermined angle. Preferably, the second snap rib 106 is formed by extending an edge of the first opening 101, and there are a multiple of first snap ribs 105 and second snap ribs 106 configured to be corresponsive to one another or staggered with one another, so as to the snap ribs can be stably latched to both side edges of the LED light panel 11.

In order to protect the light transmitting cover 10 and achieve better dustproof and waterproof effects, the switch and socket cover structure 1 further comprises a protection board 14 for covering the light transmitting cover 10, and the protection board 14 has a third opening 141 configured to be corresponsive to the first opening 101. The protection board 14 can be made of a completely transparent material or a semi-transparent material, as long as it is not necessary to shelter the light of the light emitting area 103. Of course, the protection board 14 can also be made of a heterogeneous material, as long as light can be transmitted through the light emitting area 103 corresponding to the protection board 14. For simplicity, the protection board 14 of the light transmitting cover 10 shown in FIGS. 2 to 4F are omitted.

In this embodiment, the light transmitting cover 10 has two light emitting areas 102. When there are two light emitting areas 102, the light emitting areas 102 are arranged symmetrically to each other, and extended along a side edge of the light transmitting cover 10 separately, so as to improve the light indication performance. In this embodiment, the light emitting areas 102 are arranged along the long side of the light transmitting cover 10. When there are two light emitting areas 102, the quantity of the LED light panel 11 can also be two, and the two LED light panels supply the light required by the two light emitting areas 102 respectively, wherein the switch and socket cover structure 1 of this embodiment has one light control switch component 13. At this time, the light control switch component 13 can be electrically coupled to the LED light panels 11 simultaneously to control the driving status of the LED light panels according to the detection result. Of course, when the switch and socket cover structure 1 has two LED light panels 11, two light control switch components 13 can be installed to facilitate the control of the LED light panels 11, and the quantity of the related structure of the light control switch components 13 will be changed accordingly.

With reference to FIGS. 1A, 1B, 2 and 5 to 7, FIGS. 5 to 7 show the exploded view and the perspective view of a socket structure and the schematic view of an application of the socket structure in accordance with a preferred embodiment of the present disclosure respectively, the switch and socket cover structure 1 can be used together with a socket or a switch, and the socket structure 2 disclosed by the present disclosure will be described as follows. The socket structure 2 comprises a junction box 20, a switch and socket cover structure 1 as described above, and a socket component 21. The socket structure 2 is installed at a reserved power cable position of a wall and electrically coupled to a power cable for accessing the utility power.

The junction box 20 can be made of iron or plastics, and a required hole is reserved on the junction box 20 to facilitate connecting the socket component 21 to the utility power. The switch and socket cover structure 1 is provided for covering the opening of the junction box 20. As described above, the switch and socket cover structure 1 comprises the light transmitting cover 10, the LED light panel 11, the carrying board 12 and the light control switch component 13. The specific structure of these components and the connection with one another are the same as those illustrated in FIGS. 1A, 1B and 2 and described in the related paragraphs of this specification, and thus will not be repeated. The socket component 21 is configured to be corresponsive to the first opening 101 of the light transmitting cover 10 and the second opening 121 of the carrying board 12, and the socket component 21 has a side exposed to the outside and the other side disposed inside the junction box 20, Wherein, the socket component 21 is a component having a conductive socket, and the socket holes are exposed from an end of the first opening 101 and provided for the use by users. After a connector is plugged into the socket holes, the utility power will be electrically connected to supply electrical power. The socket structure 2 is installed onto a wall and the socket component 21 is electrically connected to the utility power for applications. When detecting an insufficient ambient light, the light control switch component 13 will automatically drive the LED light panel 11 to emit light, so as to make the light emitting area 102 to emit light as well, and achieve the effect of guiding the users to the position of the socket structure 2, while having the energy saving effect. For other technical characteristics related to the switch and socket cover structure 1, please refer to the description above and the illustration given in FIGS. 1A, 1B, and 2.

With reference to FIGS. 1A, 1B, 2 and 8, FIG. 8 is the perspective view of a switch structure in accordance with a preferred embodiment of the present disclosure, the switch structure 3 comprises a junction box 30, a switch and socket cover structure 1 as described above, and a switch component 31. The switch structure 3 can be installed at the reserved wire position on a wall and electrically coupled to the power cable and any electrical wire for controlling an electronic device, in order to control the ON/OFF of an electric appliance such as a lamp.

Similarly, the junction box 30 can also be made of iron or plastics, and required holes are reserved on the junction box 30 to facilitate the electrical connection with the switch components 31. The switch and socket cover structure 1 is provided for covering the opening of the junction box 30. As described above the switch and socket cover structure 1 comprises the light transmitting cover 10, the LED light panel 11, the carrying board 12 and the light control switch component 13. The specific structure of these components and the connection with one another are the same as those illustrated in FIGS. 1A, 1B and 2 and described in the related paragraphs of this specification, and thus will not be repeated. The switch component 3 is configured to be corresponsive to the first opening 101 of the light transmitting cover 10 and the second opening 121 of the carrying board 12, and the switch component 31 has a side exposed to the outside and the other side disposed inside the junction box 30. Wherein, the switch component 31 has at least one button part 311, and the button part 311 is disposed at an end of the switch component 31 and exposed from the first opening 101 and provided for a user to control the On/Off of an electrical device. The switch structure 3 can be installed on a wall and the switch component 31 can be electrically coupled to the utility power and an electronic device required to be controlled for an application. With the switch and socket cover structure 1, if the light control switch component 13 detects an insufficient ambient light, the light control switch component will automatically drive the LED light panel 11 to emit light, so as to drive the light emitting area 102 to emit light as well, and achieve the effect of guiding a user to position of the switch structure 3, which having the energy saving effect. For other technical characteristics related to the switch and socket cover structure 1, please refer to the description above and the illustration given in FIGS. 1A, 1B, and 2.

In summation of the description above, the switch and socket cover structure and its socket structure and switch structure in accordance with the present disclosure detect the brightness of ambient light in order to achieve the effect of automatically emitting light and guiding a user to switch or socket position in a dark environment, and their application also has the advantage of energy saving. The present disclosure further provide technical characteristics such as the optical structures, fixing slots or snap ribs to improve the lighting performance and the overall structural stability, so as to provide better related products.

What is claimed is:

1. A switch and socket cover structure, comprising:
   a light transmitting over, having a first opening, at least one light emitting area and at least one light sensing area, and the light emitting area being disposed on a side of the first opening, and the light sensing area being disposed on a side of the first opening;
   at least one LED light panel, installed to bottom of the light transmitting cover and configured to be corresponsive to the light emitting area;
   a carrying board, installed to the bottom of the light transmitting cover, and having a second opening and at least one accommodating slot, and the second opening being configured to be corresponsive to the first opening, and the accommodating slot being configured to be corresponsive to the light rising area; and
   at least one light control switch component, installed in the accommodating slot and provided for the light sensing area to detect an ambient light, and the light control switch component being electrically couple to the LED light panel; wherein the light control switch component will drive the LED light panel to emit light to make the light emitting area emit light, if an insufficient ambient light is detected;
   wherein the light control switch component has a circuit board configured to be perpendicular to a surface of the light transmitting cover, and a photoresistor of the light control switch component is installed at an end of the circuit board near the light sensing area.

2. The switch and socket cover structure according to claim 1, wherein the light emitting area of the light transmitting cover has a plurality of optical structures.

3. The switch and socket cover structure according to claim 2, wherein the optical structures are bead-like bumps or hexagonal cone-shaped bumps.

4. The switch and socket cover structure according to claim 3, wherein the bottom of the light transmitting cover has at least one first snap rib and at least one second snap rib, and the first snap rib is formed by extending an edge of the light transmitting cover, and the LED light panel is fixed by the first snap rib and the second snap rib.

5. The switch and socket cover structure according to claim 4, wherein the bottom of the light transmitting cover has at least one fixing slot, and bottom of the fixing slot is the light sensing area, and the fixing slot is provided for latching the circuit board of the light control switch component.

6. The switch and socket cover structure according to claim 5, further comprising a protection board for covering the light transmitting cover, and the protection board has a third opening configured to be corresponsive to the first opening.

7. The switch and socket cover structure according to claim 6, wherein if there are two light emitting areas, the light emitting areas will be symmetrically configured and extended along a site edge of the light transmitting cover separately.

8. A socket structure, comprising:
   a junction box;
   a switch and socket cover structure according to claim 1, for covering an opening of the junction box; and
   a socket component, configured to be corresponsive to the first opening and the second opening, and the socket component has a side exposed to outside and the other side disposed inside the function box.

9. The socket structure according to claim 8, wherein the light emitting area of the light transmitting cover has a plurality of optical structures.

10. The socket structure according claim 9, wherein the light control switch component has a circuit board configured to be perpendicular to a surface of the light transmitting cover, and a photoresistor of the light control switch component is installed at an end of the circuit board near the light sensing area.

11. The socket structure according to claim 10, wherein the optical structures are bead-like bumps or hexagonal cone-shaped bumps.

12. The socket structure according claim 11, wherein the bottom of the light transmitting cover has at least one first snap rib and at least one second snap rib, and the first snap rib is formed by extending an edge of the light transmitting cover, and the LED light panel is fixed by the first snap rib and the second snap rib.

13. The socket structure according to claim 12, wherein the bottom of the light transmitting cover has at least one fixing slot, and bottom of the fixing slot is the light sensing area, and the fixing slot is provided for latching the circuit board of the light control switch component.

14. A switch structure, comprising:
   a junction box;
   a switch and socket cover structure according to claim 1, for covering an opening of the junction box; and
   a switch component, configured to be corresponsive to the first opening and the second opening, and the switch component has a side exposed to outside and the other side disposed inside the junction box.

15. The switch structure according to claim 14, wherein the light emitting area of the light transmitting cover has a plurality of optical structures.

16. The switch structure according claim 15, wherein the light control switch component has a circuit board configured to be perpendicular to a surface of the light transmitting cover, and a photoresistor of the light control switch component is installed at an end of the circuit board near the light sensing area.

17. The switch structure according to claim 16, wherein the optical structures are bead-like bumps or hexagonal cone-shaped bumps.

18. The switch structure according to claim 17, wherein the bottom of the light transmitting cover has at least one first snap rib and at least one second snap rib, and the first snap rib is formed by extending an edge of the light transmitting cover, and the LED light panel is fixed for the first snap rib and the second snap rib.

19. The switch structure according to claim 18, wherein the bottom of the light transmitting cover has at least one fixing slot, and bottom of the fixing slot is the light sensing area, and the fixing slot is provided for latching the circuit board of the light control switch component.

\* \* \* \* \*